O. M. LAMSENS.
FILTER.
APPLICATION FILED MAY 31, 1913.
1,093,999.
Patented Apr. 21, 1914.
3 SHEETS—SHEET 3.
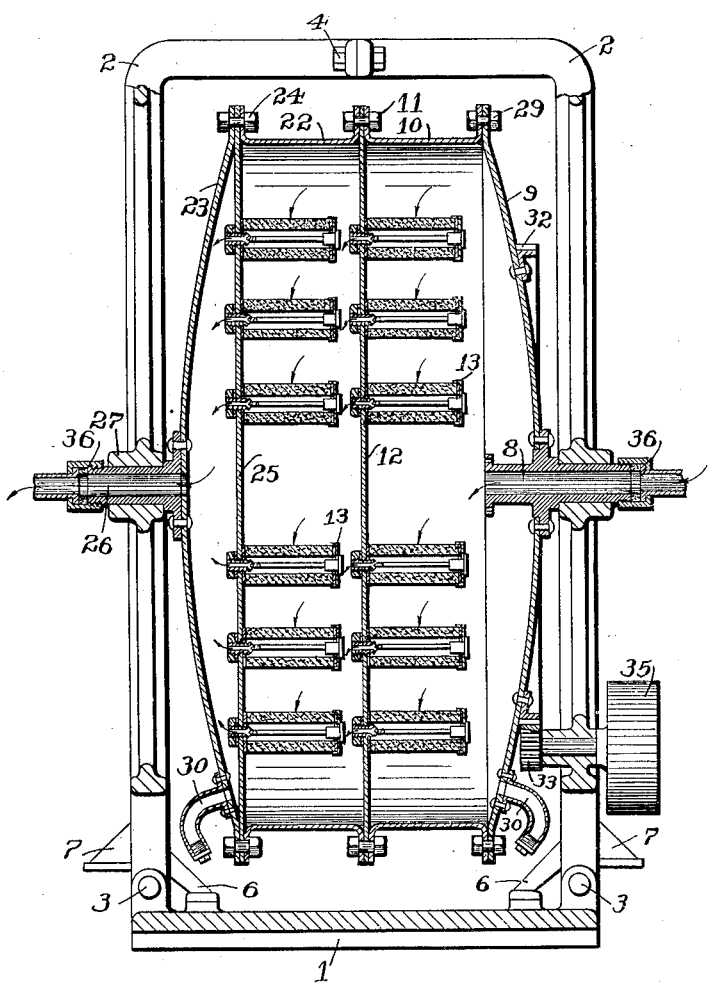
Fig. IV.
Witnesses
Chas. W. Stauffiger
Anna M. Dorr
Inventor
Oscar M. Lamsens.
By Barthel & Barthel
Attorneys

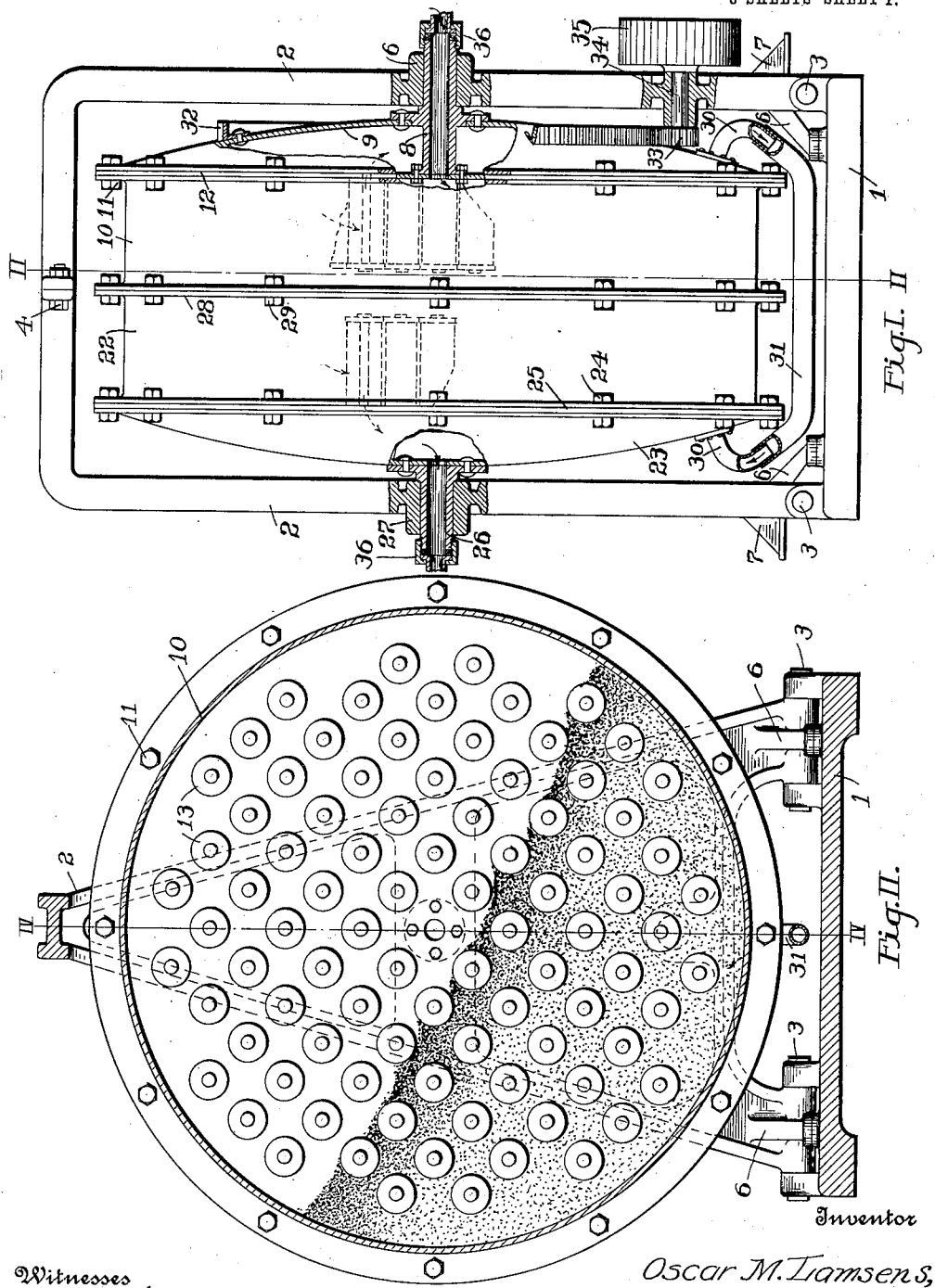

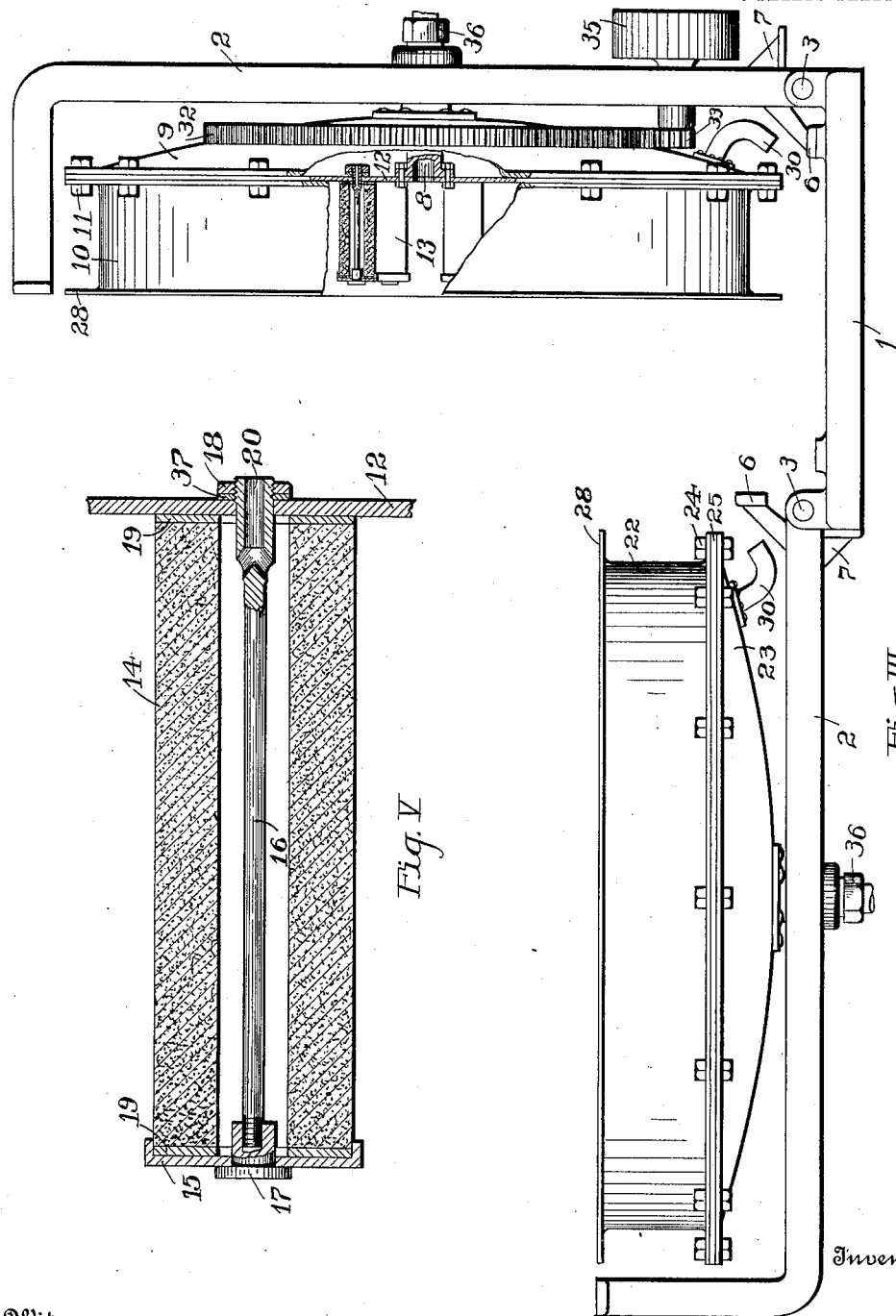

UNITED STATES PATENT OFFICE.

OSCAR M. LAMSENS, OF DETROIT, MICHIGAN.

FILTER.

1,093,999.  Specification of Letters Patent.  Patented Apr. 21, 1914.

Application filed May 31, 1913. Serial No. 770,811.

*To all whom it may concern:*

Be it known that I, OSCAR M. LAMSENS, a citizen of the United States of America, residing at Detroit, in the county of Wayne and State of Michigan, have invented certain new and useful Improvements in Filters, of which the following is a specification, reference being had therein to the accompanying drawings.

In the process of filtering beer it is necessary not only that provision be made for handling a large quantity in a small space of time but also for readily cleaning and inspecting the filtering apparatus as the latter becomes quickly coated with albumen and other coagulated material which is difficult to remove from the filtering surface.

This invention relates to a filter and particularly to one adapted for use in the manufacture of beer which includes means for keeping the surface of the filtering walls clean, which permits ready inspection for the apparatus and which is arranged for either single or double filtration.

The invention consists in the matters hereinafter set forth and particularly pointed out in the appended claims.

In the drawings, Figure 1 is a view, partially in side elevation and partially in section, of one form of apparatus that embodies features of the invention; Fig. 2 is a view in section taken on or about line II—II of Fig. 1; Fig. 3 is a view in side elevation, partially broken away and in section, showing the apparatus open for inspection; Fig. 4 is a view in section taken on or about line IV—IV of Fig. 2; and Fig. 5 is a view in longitudinal section, enlarged, of a single filtering element.

As herein shown in preferred form a base 1 affords support for a pair of oppositely disposed standards 2, of suitable design and material to combine strength with lightness, that are pivotally secured to the base as on pins 3 and are adapted to be swung together and secured by bolts 4 near their upper ends. Stops 6 aid in supporting the standards in upright position while corresponding brackets 7 hold the standards when turned into horizontal position as indicated in Fig. 3. A hollow trunnion 8 is journaled in one of the bearings 6 and supports on its inner end the crowned outer plate 9 and shell 10 of one section of a filter drum. The crowned plate and shell are secured together by bolts 11 passing through their margins and also serving, in the disposition of parts shown in Figs. 1, 2 and 3, to secure an apertured head 12 between them. The latter has a plurality of cylindrical filter members 13 secured on its inner face in substantially parallel relation to the axis of rotation of the drum. These each consist of a cylinder 14 of filter stone or like porous and permeable material that is clamped between a cap 15 and the head 12 by a rod 16 that fits an aperture in the head 12 and is in screwthreaded engagement with a suitable outer nut 17 and inner nut 18. Preferably, a spring washer 37 is used on the bolt to prevent leakage from expansion. All the apertures of the head 12 are occupied by the filter clamping rod 16. Gaskets 19 are employed to prevent leakage around the ends of the filter stone and an outlet from the bore of the stone through the head 12 is provided through a suitable duct indicated at 20 in the bolt 16. A companion shell 22 and crowned plate 23, whose margins are secured as by bolts 24 over a head 25, are carried by a hollow trunnion 26 in a bearing 27 of the other one of the standards. Filter members 13 are secured to the head 25 in a similar manner to those on the head 12. The mating marginal flanges 28 of the two shells 10 and 22 may be secured together by suitably disposed bolts 29. Suitable arranged fittings 30 on the plates 9 and 23 afford means for connection of a by-pass 31 that is preferably formed of flexible hose.

An annular gear 32 is secured on one of the heads in mesh with a pinion 33 that is driven by a shaft 34 and pulley 35 that afford one means of rotating the shell although, obviously, other mechanism may be employed. Suitable stuffing boxes 36 on the outer ends of the trunnions 8 and 26 are used for connecting the latter with supply and outlet pipes. The space in the drum around the filter stones is about half filled with broken glass 39 or like abrading and non-corrosive materials.

In Fig. 4 a disposition of parts is shown wherein one of the heads as 12 is clamped between the flanges 28 of the two shells, the by-pass 31 being omitted and the nipples 30 suitably closed or plugged.

In operation beer that is forced through the intake spindle 8 fills the entire drum and works its way through the stones into the hollow heads formed by the crowned plate, from whence it flows through the outlet trunnion 26, the by-pass 31 affording free communication between the heads. After the filter has been in use, and the albumen and coagulents of the beer have coated the exterior surfaces of the stones, the filter is revolved by its drive mechanism so that the stones are scoured by the broken glass or like material in the drum. At the same time filtered and sterilized water is forced through the filter in reverse direction, entering the bores of the stones and passing outwardly therefrom so as to readily remove any matter clinging to their outer surfaces. If it is desired to filter the beer twice, the arrangement shown in Fig. 4 is used, the liquid passing through the stones from the exterior to the interior.

When it is desired to clean the filter more thoroughly and inspect it, it can be readily opened by disconnecting the shells and standards and swinging them down into horizontal position.

Obviously, changes in the details of construction may be made without departing from the spirit of my invention and I do not care to limit myself to any particular form or arrangement of parts.

What I claim is:—

1. A filter comprising a cylindrical casing journaled to turn on its axis and provided with heads having a plurality of openings therethrough, cylindrical filtering members each secured to a head over an opening, means forming bearings for the shell at each end thereof and each having an inlet in communication with the several openings of the adjacent head, means in which the bearings are journaled, and means for rotating the shell therein.

2. A filter comprising a pair of substantially cylindrical shell sections adapted to be secured together at their ends, a crowned plate detachably secured at the outer end of each shell, a hollow trunnion secured to each plate, tiltable supporting means in which each trunnion is journaled, a head for each shell adapted to be secured to either end thereof and provided with a plurality of cylindrical filter members, an outer plate for the outer end of each shell provided with a hollow trunnion forming a passage into the shell, tiltable supports in which the plate trunnions are each journaled, and means for rotating the shell sections.

3. A filter comprising a shell, heads each adapted to be secured to an end of the shell and provided with inlet openings, a cylindrical filter member secured to each head over each opening, hollow trunnions each secured to the shell as a bearing therefor, and means for turning the shell in the supports.

4. A filter comprising a shell having two cylindrical sections adapted to be detachably secured together at their ends, filter plates each adapted to be detachably secured to an end of a section, head plates adapted to be secured to either end of each section, a plurality of cylindrical filter members secured in sets on the filter plates, the latter having openings whereby liquid may escape through the bores of the filter members, tiltable supports and head plates detachably secured on the section ends and provided with hollow trunnions journaled in the supports, the trunnions forming the inlet and outlet to the shell.

5. A filter comprising a shell having two cylindrical sections adapted to be detachably secured together at their ends, filter plates each adapted to be detachably secured to an end of a section, head plates adapted to be secured to either end of each section, a plurality of cylindrical filter members secured in sets on the filter plates, the latter having openings whereby liquid may escape through the bores of the filter members, tiltable supports, head plates detachably secured on the section ends and provided with hollow trunnions journaled in the supports, the trunnions forming the inlet and outlet to the shell, and granular scouring material partially filling the drum around the filter members.

6. A filter comprising a base, standards pivotally secured to the base and adapted to be detachably connected when in upright position, a hollow trunnion journaled in each standard, a cylindrical shell section carried on the inner end of each trunnion with an opening therethrough in communication with the trunnion bore, and head plates each adapted to be detachably secured on either end of the shell and provided with hollow filter members each having an interior passage in communication with the space between the shell plates, and means for rotating the shell in the tiltable support.

7. A filter comprising a shell formed of a pair of cylindrical sections that are adapted to be secured together in axial alinement, a head for each section secured to the end thereof and provided with openings therethrough, hollow filter members clamped on the heads each having its interior in communication with an opening therethrough, tiltable supporting members, and hollow trunnions in communication with an opening into the shell each journaled in a supporting member.

In testimony whereof I affix my signature in presence of two witnesses.

OSCAR M. LAMSENS.

Witnesses:
ANNA M. DORR,
C. R. STICKNEY.

Copies of this patent may be obtained for five cents each, by addressing the "Commissioner of Patents, Washington, D. C."